（12）United States Patent
Johnson et al.

(10) Patent No.: US 9,106,883 B2
(45) Date of Patent: Aug. 11, 2015

(54) CONTEXT DEPENDENT MULTI-ANGLE NAVIGATION TECHNIQUE FOR DIGITAL VERSATILE DISCS

(75) Inventors: Mark Rogers Johnson, Woodland Hills, CA (US); Jun Liu, Burbank, CA (US); Joseph Rice, Oakland, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 2023 days.

(21) Appl. No.: 11/578,904

(22) PCT Filed: Apr. 19, 2005

(86) PCT No.: PCT/US2005/013197
§ 371 (c)(1),
(2), (4) Date: Oct. 20, 2006

(87) PCT Pub. No.: WO2005/109873
PCT Pub. Date: Nov. 17, 2005

(65) Prior Publication Data
US 2007/0189725 A1    Aug. 16, 2007

Related U.S. Application Data

(60) Provisional application No. 60/564,415, filed on Apr. 22, 2004.

(51) Int. Cl.
*H04N 9/80* (2006.01)
*H04N 5/84* (2006.01)
(Continued)

(52) U.S. Cl.
CPC ............... *H04N 5/85* (2013.01); *G11B 27/105* (2013.01); *G11B 27/3027* (2013.01); *G11B 27/34* (2013.01); *H04N 9/8205* (2013.01);
(Continued)

(58) Field of Classification Search
USPC ......... 386/1, 45–46, 68, 75, 95–96, 101, 108, 386/124, 220, 248, 332–336, 341, 355–356
See application file for complete search history.

(56) References Cited

U.S. PATENT DOCUMENTS 5,907,658 A * 5/1999 Murase et al. ................... 386/95
5,999,698 A    12/1999 Nakai et al.
(Continued)

FOREIGN PATENT DOCUMENTS

EP    0898279    2/1999
EP    1028551    8/2000
(Continued)

*Primary Examiner* — Nigar Chowdhury
(74) *Attorney, Agent, or Firm* — Robert D. Shedd; Robert B. Levy

(57) ABSTRACT

Selection of an audio-visual stream from among a plurality of streams occurs by first detecting a navigation packet within at least one stream that provides information concerning the stream, as well as those streams in lie in synchronism therewith. From the navigation packet, a determination is made which other streams lie in synchronism with the one stream, which audio and sub-picture data packets exist in each stream, and as well as which highlight information properties exist for selecting among the synchronized streams. At least one of the audio data packets, sub-picture data packets, or highlight information properties undergoes modification in accordance with information about at least one other synchronized stream to allow display of a viewer selectable button or the like to select among the synchronized streams and/or be presented with differing audio and/or sub-picture contents with each stream.

19 Claims, 4 Drawing Sheets

(51) Int. Cl.

| | | |
|---|---|---|
| *H04N 5/89* | (2006.01) | |
| *H04N 5/85* | (2006.01) | |
| *G11B 27/10* | (2006.01) | |
| *G11B 27/30* | (2006.01) | |
| *G11B 27/34* | (2006.01) | |
| *H04N 9/82* | (2006.01) | |
| *H04N 9/804* | (2006.01) | |
| *H04N 9/806* | (2006.01) | |

(52) U.S. Cl.
CPC ...... *G11B2220/2562* (2013.01); *H04N 9/8042* (2013.01); *H04N 9/8063* (2013.01); *H04N 9/8227* (2013.01)

(56) References Cited

U.S. PATENT DOCUMENTS

| | | | |
|---|---|---|---|
| 6,137,954 A | 10/2000 | Sawabe et al. | |
| 6,151,441 A | 11/2000 | Kawamura | |
| 6,393,196 B1 * | 5/2002 | Yamane et al. | 386/281 |
| 6,469,718 B1 | 10/2002 | Setogawa | |
| 6,493,868 B1 | 12/2002 | DaSilva et al. | |
| 6,504,996 B1 | 1/2003 | Na et al. | |
| 6,507,696 B1 | 1/2003 | Chung | |
| 6,553,180 B1 | 4/2003 | Kikuchi et al. | |
| 6,640,260 B2 | 10/2003 | Seo et al. | |
| 6,954,419 B1 | 10/2005 | Kimura et al. | |
| 2002/0131767 A1 * | 9/2002 | Auwens et al. | 386/95 |
| 2003/0161615 A1 | 8/2003 | Tsumagari | |
| 2005/0213946 A1 * | 9/2005 | Braun | 386/105 |

FOREIGN PATENT DOCUMENTS

| | | |
|---|---|---|
| EP | 1052644 | 11/2000 |
| EP | 1439700 | 7/2004 |
| JP | 10145735 | 5/1998 |
| JP | 1155589 | 2/1999 |
| JP | 11103444 | 4/1999 |
| JP | 11-215466 | 8/1999 |
| JP | 2000175154 | 6/2000 |
| JP | 2000339933 | 12/2000 |
| JP | 2002152684 | 5/2002 |
| JP | 2002216460 | 8/2002 |
| JP | 2003101957 | 4/2003 |
| JP | 2003303476 | 10/2003 |
| JP | 2003324689 | 11/2003 |
| JP | 2005191826 | 7/2005 |
| JP | 2006042134 | 2/2006 |
| RU | 2142167 | 11/1999 |
| WO | WO 2004/036579 | 4/2004 |
| WO | WO 2004/055809 | 7/2004 |
| WO | WO 2004/107752 | 12/2004 |
| WO | WO 2004/109678 | 12/2004 |
| WO | WO 2004/109679 | 12/2004 |
| WO | WO 2004/109680 | 12/2004 |
| WO | WO 2005/004147 | 1/2005 |
| WO | WO 2005/109873 A2 | 11/2005 |

* cited by examiner

FIG. 5A — 302
FIG. 5B — 304
FIG. 5C — 306
FIG. 5D — 308
FIG. 5E — 310
FIG. 5F — 312
FIG. 5G — 314
FIG. 5H — 316
FIG. 5I — 318

CONTEXT DEPENDENT MULTI-ANGLE NAVIGATION TECHNIQUE FOR DIGITAL VERSATILE DISCS

CROSS-REFERENCE TO RELATED APPLICATIONS

This application claims the benefit, under 35 U.S.C. §365 of International Application PCT/US2005/013197, filed Apr. 19, 2005 which was published in accordance with PCT Article 21(2) on Nov. 17, 2005 in English and which claims the benefit of U.S. provisional patent application Ser. No. 60/564,415 filed Apr. 22, 2004.

TECHNICAL FIELD

This invention relates to Digital Versatile Discs, previously known as Digital Video Discs (DVDs) and more particularly to a technique for facilitating selection among, and interaction with, different audio/visual (A/V) streams embedded on a DVD.

BACKGROUND ART

The development of the DVD followed the development of CD ROM in an effort to achieve sufficient storage capacity for large video files to enable a single disc could carry a full length motion picture, albeit compressed using a compression technique such as the Moving Picture Expert Group compression (MPEG) technique. Since its first introduction in the mid 1990's, the DVD has proliferated, becoming the preferred medium of choice for wide scale distribution of motion picture and video content to consumers.

Present day DVDs typically include at least one, and usually several A/V/streams in parallel synchronism to each other. Often such A/V streams comprise different recordings of the same scene shot from a different angle. Hence, such different A/V streams are often referred to as "angles". Selection of different angles (i.e., different streams) occurs through a process known as "multi-angle navigation" whereby a viewer selects a desired angle by selecting an associated icon on a display screen. The DVD specification adopted by the manufacturers of DVDs and associated playback devices defines a process known as "multi-angle video" whereby a content author can define as many as nine concurrent A/V streams, any one of which can appear on a display screen at any time. During playback, the viewer can switch seamlessly among a set of synchronized A/V streams by actuating a command via a button on a DVD player or on the remote control device for such player. However, under known implementations of currently available DVD authoring software, the button highlight information (HLI) stored in each A/V stream always remains identical to that in other streams.

As a result a given button will appear in the same way and in the same location to enable execution of the same command no matter what angle appears on the display screen. Additional HLI properties will also be the same, such as instructions for directional navigation between buttons and button color schemes. Sub-picture and audio data stored in each A/V stream also remains identical. Such Sub-picture data describes the rendering of buttons, subtitles, and other graphical elements displayed over video.

Thus, there exists a need for multi-angle DVD navigation technique that affords the content author an ability to both assign contextually dependent interactivity and to substitute differing audio and sub-picture data into parallel, synchronized Audio/Visual (A/V) streams playing from a DVD.

BRIEF SUMMARY OF THE INVENTION

Briefly, in accordance with a preferred embodiment of the present principles, there is provided a method for enabling a viewer to seamlessly select among a plurality of audio-visual streams recorded on a storage medium. The method commences by detecting a first navigation data packet within at least one stream. A determination is made from the navigation packet which of the other streams lie in synchronism, and which highlight properties exist, including selection commands, within at least one stream for selecting among the synchronous streams. Then at least one synchronous stream highlight property, e.g. a selection command, undergoes a modification of at least one of its appearance, location, and execution functionality for subsequent display to the viewer. A viewer who receives a display command can thus effect a switching of streams. In this way, a content author can embed unique interactive buttons with unique attendant properties into each of the parallel streams in a manner that allows the viewer to interact with the streams and execute commands, such as changing seamlessly to another parallel A/V stream, selecting alternate audio or subtitle content, or jumping to other presentation content.

A method is also provided for the content author to modify sub-picture and/or audio data within at least one of a plurality of audio-visual streams presented in parallel. This method commences by detecting a first navigation packet within at least one stream. A determination is made from the navigation packet which of the other streams lie in synchronism, and what audio and sub-picture packets exist within each stream. Then, the data payload of one or more audio and/or sub-picture packets is modified. An A/V stream in a parallel presentation will then have differing sub-picture and audio contents compared to the other synchronous streams. In this way, a content author can embed within each A/V stream unique audio and/or sub-picture content, providing an advantage over traditional methods, where alternate content must exist in additional sub-streams within each A/V stream.

BRIEF SUMMARY OF THE DRAWINGS

FIG. 2 depicts the relationship among an audio/visual stream, Video Object Units (VOBUs) and an Interleave Units (ILVUs)

FIGS. 3A and 3B depict two video screens each displaying two different angles, with each screen displaying an inverse angle arrangement from the other;

FIGS. 5A-5I each depicts a video screen showing one of nine separate angles arranged in different ways in accordance with the present principles.

DETAILED DESCRIPTION

Figure 1:
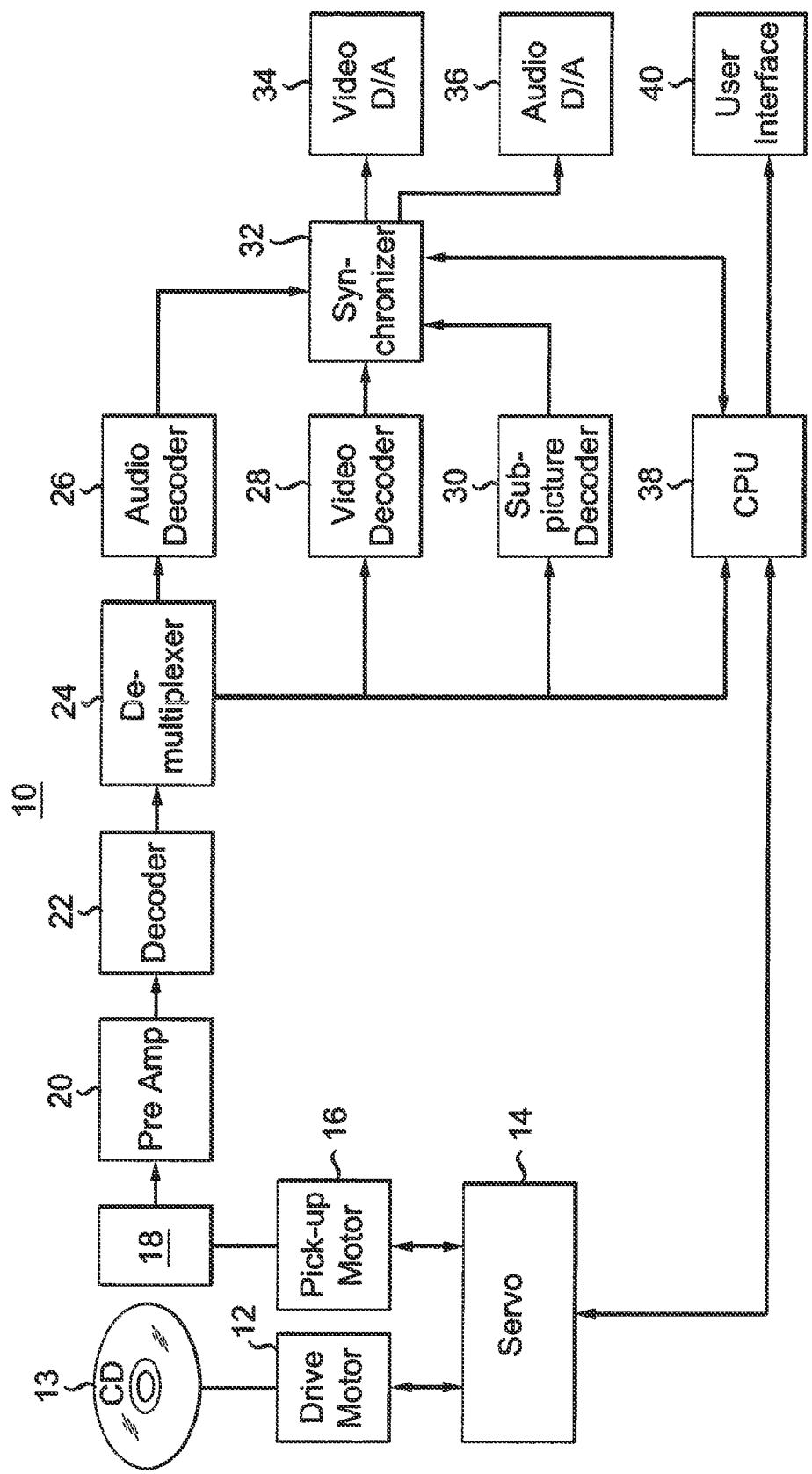
FIG. 1 depicts a block schematic diagram of a present day DVD player useful for practicing the multi-angle navigation technique of the present principles.
Figure 4A:
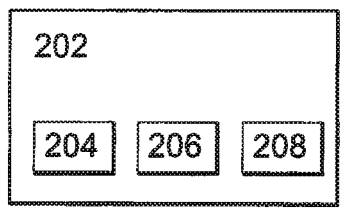
FIGS. 4A-4D each depicts a video screen with four angles in each of four separate arrangements in accordance with the present principles.
Figure 4B:
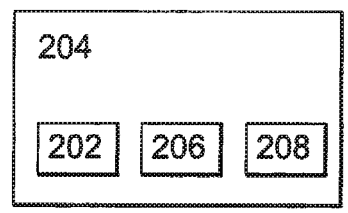
Figure 4C:
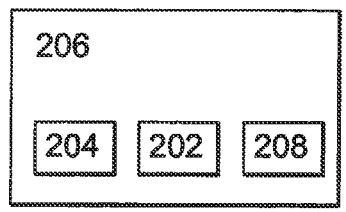
Figure 4D:
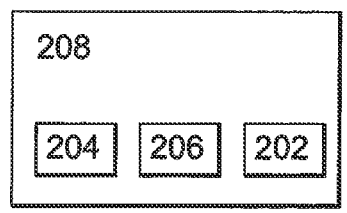

FIG. 1 depicts a block schematic diagram of a prior-art Digital Versatile Disc (DVD) player 10 useful for practicing the DVD navigation technique of the present invention. The DVD player 10 includes a drive motor 12 that rotates a DVD 13 under the control of a servomechanism 14. A pick-up head motor 16, also controlled by the servomechanism 14, serves to displace an optical pick-up head 18 across the DVD 13 to read information carried thereby. A pre-amplifier 20 amplifies the output signal of the pick-up head 18 for input to a decoder 22 that decodes the optical information read from the DVD 13 to yield a program stream. A de-multiplexer 24 de-multiplexes the program stream into separate components: (a) an audio stream, (b) a video stream, (c) a sub-picture stream and (d) navigation information, typically in the form of metadata or the like.

The audio, video, and sub-picture streams undergo decoding by a separate one of audio decoder 26, video decoder 28 and sub-picture decoder 30, respectively. A synchronizer 36, some times known as a presentation engine, serves to synchronize and combine the separately decoded audio, video and sub-picture streams into a video stream, with embedded audio for suitable reproduction in accordance with one of several known television formats, such as NTSC or PAL for example. A video digital-to-analog converter 34 converts the video stream into analog video for display on a display device (not shown) such as a television set, while an audio digital-to-analog-converter converts the embedded audio to analog audio for subsequent reproduction by the display device or by other means (not shown).

Within the DVD player 10, a central processing unit (CPU) 38, typically in the form of a microprocessor with associated memory, or a microcomputer or microcontroller, serves to control navigation, as well as other aspects of the DVD player, in accordance with viewer commands entered through a viewer interface (U/I) 40, typically comprising the combination of an Infrared (I/R) transmitter, in the form of remote control, and an I/R receiver. Specifically with regard to navigation, the CPU 38 receives decoded metadata form the demultiplexer 24 and generates menu information for receipt by the synchronizer 32. In this way, the menu information ultimately undergoes display for viewing by the viewer. In response to the displayed information, the viewer typically will enter one or more commands through the U/I 40 for receipt by the CPU 38, which in turn, controls the servomechanism 14 to displace the pick-up head 18 to retrieve the desired program content.

The DVD specification (DVD Specifications for Read-Only Disc/Part 3. VIDEO SPECIFICATIONS, Version 1.0, August 1996), defines the smallest object to which DVD navigation can apply as a Video Object Unit (VOBU). The VOBU typically contains multiplexed video, audio, sub-picture, highlight and other navigation data, corresponding to playback duration of 0.4 to 1.2 seconds. Multiple sub-streams of audio and sub-picture data can exist in each VOBU (e.g. stereo and surround audio sub-streams and/or German and Portuguese subtitles.) This combination of such multiplexed data constitutes an "A/V stream." In a multi-angle segment, multiple A/V streams are interleaved together into a single Video Object (VOB) stream in order to allow quick access from one stream to another for seamless or near-seamless switching.

The DVD specification defines an Interleave Unit (ILVU) as a block of one or more VOBUs in order to align the A/V stream content of multiple angles with a common time stamp, providing synchronization of the A/V streams. During playback, the synchronizer 32 decodes and displays only the ILVUs corresponding to the currently selected A/V stream. The DVD specification defines a maximum size of the ILVU based on number of angles (i.e., number of available streams), scan speed of the physical device, and size of the decode buffer (not shown). If this maximum size is exceeded, seamless playback of any angle cannot be guaranteed.

FIG. 2 illustrates the relationship of multiplexed A/V stream data to VOBU and ILVU data structures for multi-angle video. As illustrated in FIG. 2, each block of the program stream decoded by the decoder 22 of FIG. 1 includes a navigation packet (NV_PCK), a video packet (V_PCK), an audio packet (A_PCK) and a sub-picture packet (SP_PCK). The DVD specification defines a Seamless Angle Information data structure (SML_AGLI) in the navigation data structure (DSI) portion of the NV_PCK at the beginning of each VOBU that includes a table of ILVU start points indicating the location where the next ILVU for each seamless angle is located. Such information enables the CPU 38 of FIG. 1 to control the servomechanism 14 where to go within the VOB stream when it is ready to begin presenting the next ILVU.

In addition, the DVD specification defines several data structures within a portion of the navigation data at the beginning of each VOBU that describe the Highlight Information (HLI) for interactive buttons. These data structures, such as the Highlight General Information (HLI_GI), Button Color Information Table (BTN_COLIT), and Button Information Table (BTN_IT) define the number, position, appearance, and function of the buttons that appear in the screen display.

In accordance with the present principles, the Highlight information can undergo manipulation to alter the information displayed to the viewer, such as the picture-in-picture menu display to enable the selection of different streams. Given a set of seamless multi-angle VOB streams for a DVD disc that already contains an existing set of interactive buttons that are identical for all angles, low-level manipulation of the Highlight Information (HLI) multiplexed into each angle stream, can occur follows via the following process:

1. Scan the VOB stream to locate the first NV_PCK that includes non-zero values in the Seamless Angle Information (SML_AGLI) table in order to determine where seamless multi-angle data begins.
2. Determine the number of angles, number of buttons, size of the ILVU, and start address of ILVUs of each angle from this NV_PCK.
3. Modify the Highlight Information as desired for the current angle. If the Highlight Information now differs from the previous VOBU, then reset the Highlight Information Status (HLI_SS) value to 01b, in accordance with the DVD specification.
4. Loop through each VOBU of the current ILVU, repeating Step #3.
5. Loop through each subsequent ILVU, repeating the above steps.

The above-described process typically occurs using a software utility that takes as input the VIDEO_TS directory of files intended for a DVD and outputs a modified VIDEO_TS directory of files with the VOB streams adjusted according to the content author's intent. By way of explanation, on a DVD disc, the DVD movies appear in the VIDEO_TS directory, whereas the AUDIO_TS directory stores DVD audio. Such a software utility would exist comprise the following functions and classes for execution:

DVDDataSeach( )

This function searches for the VOB packet header indicator and retrieves the size of the IVLU block and reference data for the first video angle.

GetDataPosition( )

This function retrieves the button, command, and ILVU size information, the location of which is defined in the DVD specification.

DoVOBUChange( )

This function checks the angle identifier and gets the button information from GetDataPosition( ). Further, this function modifies the button information according to the viewer input.

separate one of the angles appearing as picture-in-picture elements, a viewer can select and seamlessly switch to one of the alternate video angles. The selection button function associated with each angle of the angles 202, 204, 206 and 208 appear as follows:

| Angle 202: | Angle 204: | Angle 206: | Angle 208: |
|---|---|---|---|
| 1: Set Angle = 204 | 1: Set Angle = 202 | 1: Set Angle = 204 | 1: Set Angle = 204 |
| 2: Set Angle = 206 | 2: Set Angle = 206 | 2: Set Angle = 202 | 2: Set Angle = 206 |
| 3: Set Angle = 208 | 3: Set Angle = 208 | 3: Set Angle = 208 | 3: Set Angle = 202 |

ProcessAngles( )

This function initiates a loop through the VOB stream to locate and process each instance of seamless multi-angle data.

CAngleNavigateAppDlg

This function establishes class definitions for the viewer interface by which the content author can specify the modification of each angle's button highlight information.

The following examples illustrate different ways of providing contextually dependent multi-angle selection choices in accordance with the present principles.

Example # 1—Switch

FIGS. 3A and 3B collectively depict a simple example of a switch between first and second angles 102 and 104, with each angle having associated video content. Each angle occupies a full frame of a video display and includes a button 106 appearing at the bottom of the frame. A viewer seeking to change angles click or otherwise actuates the button 106. Thus, for example in FIG. 3A with the angle 102 displayed full screen, a viewer clicks the button 106 to select angle 104 to appear full screen as shown in FIG. 3B. Conversely, with the angle 104 now displayed full screen in FIG. 3B, the viewer clicks on the button 106 in that screen to select the angle 102 to appear full screen as seen in FIG. 3A. The button 106, which can appear either as a visible or invisible element, thus permits simple toggling from one angle to the other and back again. Thus, the command set for button 106 will have the following states angles 102 and 104

| Angle 102: | Angle 104: |
|---|---|
| 1: Set Angle = 104 | 1: Set Angle = 102 |

Example 2

Preview

FIGS. 4A-4E each depicts a multi-angle video displays comprised of four video angles 202, 204, 206 and 208, respectively, with one of the angles appearing full screen, and the others each appearing as "picture-in-picture" elements along the bottom of the full screen angle. Each of the "picture-in-picture angles" provides both a preview to that angle as well as a selector button allowing seamless switching to that angle. Thus, in each of FIGS. 4A-4D, the angles 202, 204, 206 and 208, respectively appear full screen with the other angles appearing as picture-in-picture elements. By clicking on a In this example, only one button selection need occur to change from one angle to the next, with all three "picture-in-picture-in-picture elements modified across all four angles.

C. Example Embodiment #3

Direct

FIGS. 5A-5I each depict one of nine separate angles 302, 304, 306, 308, 310, 312, 314, 316 and 318, respectively, in different arrangements which affords the viewer the experience of directly navigating through 3D space. Within each of FIGS. 5A-5I, each angle represents a point of view on a grid. Five buttons respectively appear in each video angle, and each button lies in the same orientation as a separate one of the Select, Up Arrow, Down Arrow, Left Arrow and Right Arrow keys on a typical DVD player's remote control. Although visible in FIGS. 5A-5I, these buttons are typically invisible in practice. The buttons are mapped to direction such that Button 1=Up, Button 2=Left, Button 3=Center (Select), Button 4=Right, and Button 5=Down. The Select button (at the center) is highlighted by default, and the remaining buttons become automatically activated when the corresponding direction is selected. Therefore, when the viewer presses the Right Arrow key on the remote control, the corresponding (invisible) button (Button 4) will execute its command. Each of the five-buttons in each of FIGS. 5A-5I selects a corresponding one of the angles 302-318.

As shown in the diagrams below, to achieve this sense of seamlessly stepping through a 3D space a complex combination of button commands is required, customized to each video angle.

The selection button function associated with each angle of the angles 302, 304, 306, 308, 310, 312, 314, 316, and 318 appear as follows:

| Angle 302: | Angle 304: | Angle 306: |
|---|---|---|
| 1: Set Angle = 302 | 1: Set Angle = 304 | 1: Set Angle = 306 |
| 2: Set Angle = 302 | 2: Set Angle = 302 | 2: Set Angle = 304 |
| 3: Set Angle = 314 | 3: Set Angle = 316 | 3: Set Angle = 318 |
| 4: Set Angle = 304 | 4: Set Angle = 306 | 4: Set Angle = 306 |
| 5: Set Angle = 308 | 5: Set Angle = 310 | 5: Set Angle = 312 |

| Angle 308: | Angle 310: | Angle 312: |
|---|---|---|
| 1: Set Angle = 302 | 1: Set Angle = 304 | 1: Set Angle = 306 |
| 2: Set Angle = 304 | 2: Set Angle = 308 | 2: Set Angle = 310 |
| 3: Set Angle = 302 | 3: Set Angle = 304 | 3: Set Angle = 306 |
| 4: Set Angle = 310 | 4: Set Angle = 312 | 4: Set Angle = 312 |
| 5: Set Angle = 314 | 5: Set Angle = 316 | 5: Set Angle = 318 |

| Angle 314: | Angle 316: | Angle 318: |
|---|---|---|
| 1: Set Angle = 308 | 1: Set Angle = 310 | 1: Set Angle = 312 |
| 2: Set Angle = 314 | 2: Set Angle = 314 | 2: Set Angle = 316 |

-continued

| 3: Set Angle = 308 | 3: Set Angle = 310 | 3: Set Angle = 312 |
| 4: Set Angle = 316 | 4: Set Angle = 318 | 4: Set Angle = 318 |
| 5: Set Angle = 314 | 5: Set Angle = 316 | 5: Set Angle = 318 |

As noted above, the button commands 1-5 associated with each of the angles 302-318 in the above table correspond to the button layout in FIGS. 5A-5I (e.g. 1=up, 2=left, 3=center 4=right, 5=down)

The directional navigation (via Up Arrow, Down Arrow, Left Arrow, or Right Arrow) from the center button (Button 3) is shown in the table below. In this example, directional navigation is disallowed when the function of the button navigated to would have no visible result (e.g. a command selecting the current angle.)

| Angle 302: | Angle 304: | Angle 306: |
|---|---|---|
| Up: None | Up: None | Up: None |
| Left: None | Left: Button 2 | Left: Button 2 |
| Right: Button 4 | Right: Button 4 | Right: None |
| Down: Button 5 | Down: Button 5 | Down: Button 5 |
| Angle 308: | Angle 310: | Angle 312: |
| Up: Button 1 | Up: Button 1 | Up: Button 1 |
| Left: None | Left: Button 2 | Left: Button 2 |
| Right: Button 4 | Right: Button 4 | Right: None |
| Down: Button 5 | Down: Button 5 | Down: Button 5 |
| Angle 314: | Angle 316: | Angle 318: |
| Up: Button 1 | Up: Button 1 | Up: Button 1 |
| Left: None | Left: Button 2 | Left: Button 2 |
| Right: Button 4 | Right: Button 4 | Right: None |
| Down: None | Down: None | Down: None |

In accordance with the present principles, the sub-picture and audio data within a particular sub-stream within each A/V stream in a parallel presentation can undergo manipulation to alter the information presented to the viewer, such as different audio commentary or audio mix within each A/V stream or different button shapes or subtitles.
1. Scan the VOB stream to locate the first NV_PCK that includes non-zero values in the Seamless Angle Information (SML_AGLI) table in order to determine where seamless multi-angle data begins.
2. Determine the number of angles, number of buttons, size of the ILVU, and start address of ILVUs of each angle from this NV_PCK.
3. Modify the A_PCK and SP_PCK data as desired for the current angle.
4. Loop through each VOBU of the current ILVU, repeating Step #3.
5. Loop through each subsequent ILVU, repeating the above steps.

The above-described process typically occurs using a software utility that takes as input the VIDEO_TS directory of files intended for a DVD and outputs a modified VIDEO_TS directory of files with the VOB streams adjusted according to the content author's intent. By way of explanation, on a DVD disc, the DVD movies appear in the VIDEO_TS directory, whereas the AUDIO_TS directory stores DVD audio. Such a software utility would comprise the following functions and classes for execution:
DVDDataSeach( )
This function searches for the VOB packet header indicator and retrieves the size of the IVLU block and reference data for the first video angle.
GetDataPosition( )
This function retrieves the button, command, and ILVU size information, the location of which is defined in the DVD specification.
DoVOBUChange( )
This function checks the angle identifier and gets the A_PCK and SP_PCK location from GetDataPosition( ).
ProcessAngles( )
This function initiates a loop through the VOB stream to locate and process each instance of seamless multi-angle data.

The following example illustrates one embodiment of differing audio and sub-picture data within the same sub-stream between different angles in a seamless multi-angle presentation in accordance with the present principles.

Example #1

Director's Commentary

A seamless multi-angle presentation is used to provide visual director's commentary for a scene. Two A/V streams are presented in parallel. The first A/V stream presents the scene, while the second A/V stream presents the scene with an image of the director composited into the frame. Each A/V stream contains one sub-picture sub-stream and one audio sub-stream. The audio sub-stream of A/V stream 1 contains the actors' dialogue only. The audio sub-stream of A/V stream 2 contains the actors' dialogue mixed with the director's commentary. The sub-picture sub-stream of A/V stream 1 contains subtitles of the actors' dialogue only. The sub-picture sub-stream of A/V stream 2 contains subtitles of both the actors' dialogue and the director's commentary.

The foregoing describes a technique for provided a method for enabling a viewer to seamlessly select among a plurality of audio-visual streams recorded on a storage medium by means of interactive elements that are unique for each stream. While the seamless selection technique of the present principles has been described with respect to the DVD specification, the technique also applies to HD DVD-Video Specification Version 0.9. Further the technique is also applicable to the so-called "Blue Ray" (BD) disc as well.

The invention claimed is:
1. A disc, comprising:
a plurality of audio-visual streams, at least one navigation packet in at least one stream that contains data indicating which streams constitute a set of seamless multi-angle streams and also contain highlight information properties for enabling selection among other streams in said set of seamless multi-angle streams; and
at least one highlight information property associated with the at least one stream being modifiable independently of at least one highlight information property associated with at least one other stream in the set of seamless multi-angle streams upon disc playback to enable a change in visibility from invisibility of the at least one highlight information property so that the at least one highlight information, previously not visible now becomes visible to a viewer.
2. The disc according to claim 1 wherein the at least one highlight information property is modifiable to provide the display of at least one button, which upon execution by the viewer, enables toggling between first and second audio/visual displays.

3. The disc according to claim 1 wherein the at least one highlight information property is modifiable to highlight information to display the at least one button at a prescribed position within the display.

4. The disc according to claim 1 wherein the at least one highlight information property is modifiable to modify the functionality of the highlight information property to provide for display of a plurality of preview panes within an audiovisual stream, each preview pane being selectable by the viewer to effect a full frame display of another audio-visual stream.

5. The disc according to claim 1 wherein the at least one highlight information property is modifiable to modify the appearance of the at least one highlight information property so each preview pane provides a display of the corresponding audiovisual stream.

6. The disc according to claim 1 wherein the at least one highlight information property is modifiable to modify the appearance of the at least one highlight information property to effect the display of invisible buttons which become visible upon actuation by a user to select one of the streams.

7. A method for enabling a viewer to select among a plurality of audio-visual streams recorded on a storage medium, comprising the steps of:
   detecting a first navigation data packet within at least one stream;
   determining from the navigation packet which other streams constitute a set of seamless multi-angle streams, and which highlight information properties exist for enabling selection among said other streams in said set of seamless multi-angle streams; and
   modifying at least one of the highlight information properties to change its visibility from invisibility so that the at least one highlight information, previously not visible, now becomes visible to a viewer.

8. The method according to claim 7 wherein the modifying step further comprises the step of modifying the at least one highlight information property in accordance with at least one other stream in said set of seamless multi-angle streams.

9. The method according to claim 7 wherein the modifying step further includes the step of modifying functionality of the at least one highlight information property to provide the display of at least one button, which upon execution by the viewer, enables toggling between first and second audio/visual displays.

10. The method according to claim 9 wherein the modifying step includes the step of modifying the functionality of the at least one highlight information property to provide for display of a plurality of preview panes within an audiovisual stream, each preview pane being selectable by the viewer to effect a full frame display of another audio-visual stream.

11. The method according to claim 7 wherein each stream has multiple interleave units and each interleave object has multiple video objects and wherein the determining step is repeated for each video object within each interleave unit within the at least one stream.

12. Apparatus for enabling a viewer to select among a plurality of audio-visual streams recorded on a storage medium, comprising the steps of:
   means for detecting a first navigation data packet within at least one stream;
   means for determining from the navigation packet which other streams constitute a set of seamless multi-angle stream with said at least one stream, and which highlight information properties exist for selecting among the other streams in said set of seamless multi-angle streams; and
   means modifying at least one of the highlight information properties to change its visibility from invisibility so that the at least one highlight information, previously not visible, now becomes visible to a viewer.

13. The apparatus according to claim 12 wherein the modifying means modifies the at least one highlight information property in accordance with at least one other stream in said set of seamless multi-angle streams.

14. The apparatus according to claim 12 wherein the modifying means modifies the functionality of the at least one highlight information property to provide the display of at least one button, which upon execution by the viewer, enables toggling between first and second audio/visual displays.

15. The apparatus according to claim 14 wherein the modifying means modifies the functionality of the at least one highlight information property to provide for display of a plurality of preview panes within an audio-visual stream, each preview pane being selectable by a viewer to effect a full frame display of a selected audio-visual stream.

16. The apparatus according to claim 12 wherein the modifying means modifies the appearance of the at least one highlight information property so each preview pane provides a display of the selected audio-visual stream.

17. The apparatus according to claim 12 wherein the modifying means modifies the visibility of the at least one highlight information property to effect the display of invisible buttons which become visible upon actuation by a user to select one of the streams.

18. The apparatus according to claim 12 wherein each stream has multiple interleave units and multiple video objects within each interleave unit and wherein the determining means determines which streams constitute said set of seamless multi-angle streams for each video object within each interleave unit within the at least one stream.

19. An audio visual player, comprising:
   a decoder for decoding a plurality of audio-visuals streams for display, at least one stream containing at least one navigation packet in at least one stream that contains data indicating which streams constitute a set of seamless multi-angle streams with each other and also containing highlight information properties for enabling selection among other streams in said set of seamless multi-angle streams; the at least one of the highlight information property associated with the at least one stream being modifiable independently of at least one highlight information property associated with at least one other stream in said set of seamless multi-angle streams; and
   a processor responsive to user selection of the at least one highlight property to change its visibility from invisibility of the at least one highlight information property displayed upon disc playback so that the at least one highlight information, previously not visible, now becomes visible to a viewer.

* * * * *